US011641509B2

(12) United States Patent
Cook

(10) Patent No.: US 11,641,509 B2
(45) Date of Patent: *****May 2, 2023

(54) INTELLIGENT TAP WITH DYNAMICALLY CONFIGURABLE AMPLIFIER GAIN

(71) Applicant: Charter Communications Operating, LLC, St. Louis, MO (US)

(72) Inventor: Charles Cook, Castle Rock, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 59 days.

This patent is subject to a terminal disclaimer.

(21) Appl. No.: 17/443,343

(22) Filed: Jul. 26, 2021

(65) Prior Publication Data

US 2022/0109918 A1   Apr. 7, 2022

Related U.S. Application Data

(63) Continuation of application No. 17/062,665, filed on Oct. 5, 2020, now Pat. No. 11,122,339.

(51) Int. Cl.
  *H04N 21/61*      (2011.01)
  *H04N 21/643*    (2011.01)
  *H04N 7/10*       (2006.01)
  *H04L 12/28*     (2006.01)

(52) U.S. Cl.
  CPC ..... *H04N 21/6168* (2013.01); *H04L 12/2801* (2013.01); *H04N 7/102* (2013.01); *H04N 21/643* (2013.01)

(58) Field of Classification Search
  None
  See application file for complete search history.

(56) References Cited

U.S. PATENT DOCUMENTS

| | | | |
|---|---|---|---|
| 8,464,301 B2 | 6/2013 | Olson et al. | |
| 11,122,339 B1* | 9/2021 | Cook | H04N 21/6118 |
| 2009/0113510 A1 | 4/2009 | Knutson et al. | |
| 2009/0133095 A1* | 5/2009 | Phillips | H03H 7/482 |
| | | | 725/149 |
| 2011/0280574 A1 | 11/2011 | Finkelstein | |
| 2013/0004179 A1 | 1/2013 | Nielsen et al. | |
| 2015/0236460 A1 | 8/2015 | Ariesen et al. | |

(Continued)

*Primary Examiner* — Junior O Mendoza
(74) *Attorney, Agent, or Firm* — Young Basile Hanlon & MacFarlane, P.C.

(57) ABSTRACT

Methods and systems for an intelligent tap with dynamically configurable amplifier gain. The intelligent tap includes a filter configured to process a signal received from a service provider system via a hybrid fiber-coaxial network, an amplifier connected to the filter, the amplifier configured to apply a feedback controlled gain value to the signal to generate an output signal, where the feedback controlled gain value is based on a comparison of a target signal strength to a sampled output signal strength, and a signal strength measuring component connected to the amplifier in a feedback loop, the signal strength measuring component configured to sample the output signal, and compare a signal strength of a sampled output signal to the target signal strength to generate the feedback controlled gain value, where application of the feedback controlled gain value maintains the output signal at a constant amplitude pursuant to the target signal strength.

19 Claims, 3 Drawing Sheets

(56) References Cited

U.S. PATENT DOCUMENTS

| | | | |
|---|---|---|---|
| 2019/0020430 A1* | 1/2019 | Finkelstein | H04L 1/0002 |
| 2019/0098624 A1 | 3/2019 | Vaidya et al. | |
| 2019/0109608 A1* | 4/2019 | Padden | H04B 1/1027 |
| 2019/0296929 A1 | 9/2019 | Milicevic et al. | |
| 2020/0136735 A1* | 4/2020 | Aasen | H04N 21/615 |
| 2022/0069925 A1* | 3/2022 | Yates | H04B 17/318 |

* cited by examiner

INTELLIGENT TAP WITH DYNAMICALLY CONFIGURABLE AMPLIFIER GAIN

CROSS REFERENCE TO RELATED APPLICATION

This application is a continuation of U.S. application Ser. No. 17/062,665 filed Oct. 5, 2020, of which is incorporated herein by reference.

TECHNICAL FIELD

This disclosure relates to telecommunications systems. In particular, the disclosure is for a tap with an amplifier dynamically configurable based on signal measurements.

BACKGROUND

Hybrid fiber-coaxial (HFC) networks including, for example, HFC Data Over Cable Service Interface Specification (DOCSIS) networks, use taps every few houses to connect houses to the HFC DOCSIS network to supply content or media signals to subscribers. The DOCSIS radio frequency (RF) signal is transmitted from a cable modem termination system (CMTS). The farther from the CMTS a Living Unit (LU) or premises is from the CMTS, the weaker the signal. In DOCSIS designs, the signal to all F-connectors at all the premises is approximately the same in order to have uniform performance. In order to do this, an attenuator is placed at each tap. If the tap is close to the CMTS, the attenuator applies significant attenuation to the signal. If the tap is at the very end and far away, the attenuator applies little or no attenuation to the signal. As a result, technicians must have many different taps with differing amounts of attenuation. This is inefficient.

SUMMARY

Disclosed herein is an intelligent tap with dynamically configurable amplifier gain.

In implementations, an intelligent tap includes a filter configured to process a content signal received from a service provider system via a hybrid fiber-coaxial network, an amplifier connected to the filter, the amplifier configured to apply a feedback controlled gain value to the content signal to generate an output content signal, where the feedback controlled gain value is based on a comparison of a target signal strength to a sampled output signal strength, and a signal strength measuring component connected to the amplifier in a feedback loop, the signal strength measuring component configured to sample the output content signal, and compare a signal strength of a sampled output signal to the target signal strength to generate the feedback controlled gain value, where application of the feedback controlled gain value maintains the output content signal at a constant amplitude pursuant to the target signal strength.

BRIEF DESCRIPTION OF THE DRAWINGS

The disclosure is best understood from the following detailed description when read in conjunction with the accompanying drawings. It is emphasized that, according to common practice, the various features of the drawings are not to scale. On the contrary, the dimensions of the various features are arbitrarily expanded or reduced for clarity.

DETAILED DESCRIPTION

Figure 1:
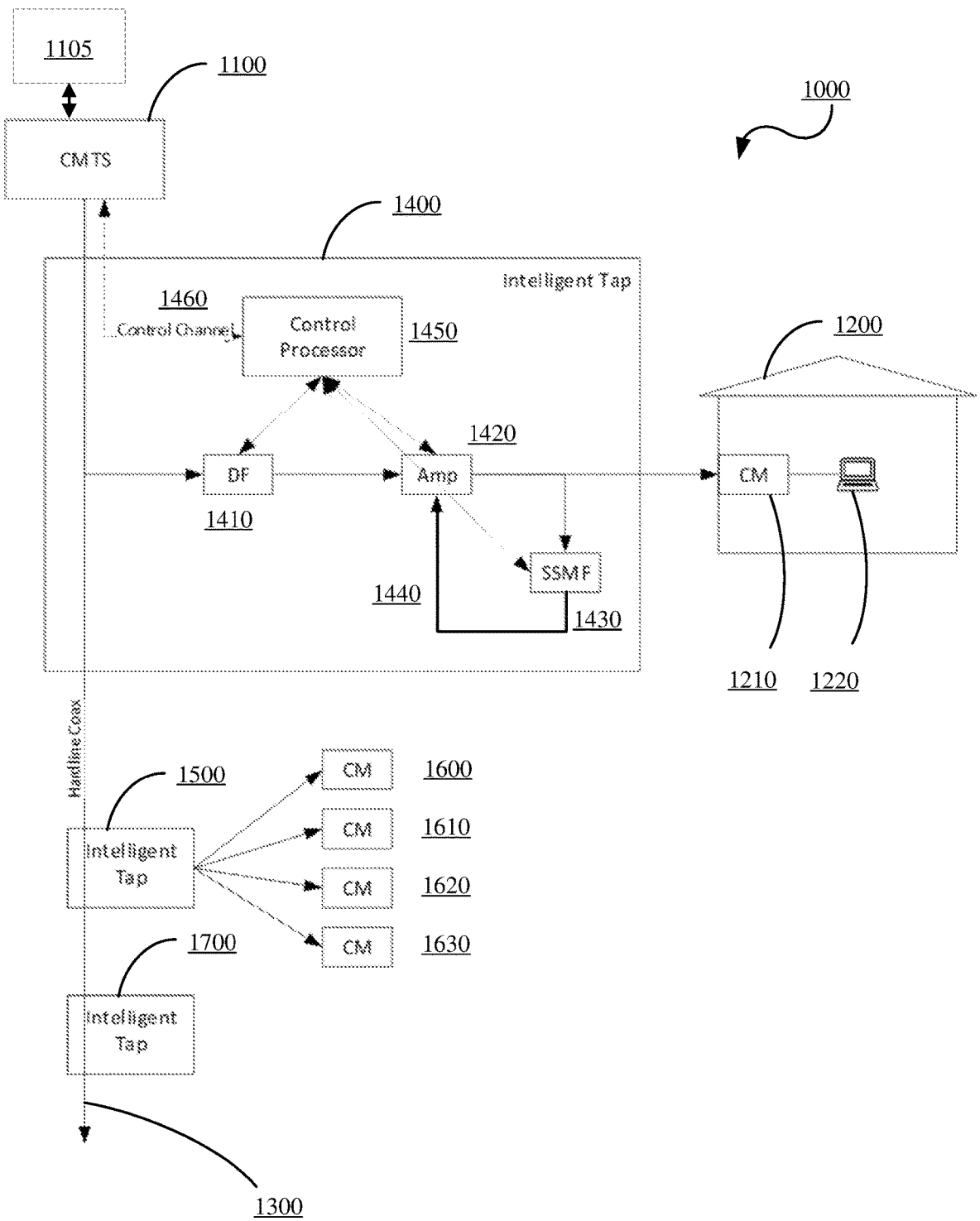
FIG. 1 is a diagram of an example network with intelligent taps in accordance with embodiments of this disclosure.

Reference will now be made in greater detail to embodiments of the invention, examples of which are illustrated in the accompanying drawings. Wherever possible, the same reference numerals will be used throughout the drawings and the description to refer to the same or like parts.

As used herein, the terminology "computer", "computing device", or "computing platform" includes any unit, or combination of units, in a distributive platform, centralized platform, or combinations thereof, capable of performing any method, or any portion or portions thereof, disclosed herein. For example, the "computer" or "computing device" may include at least one or more processor(s).

As used herein, the terminology "processor" indicates one or more processors, such as one or more special purpose processors, one or more digital signal processors, one or more microprocessors, one or more controllers, one or more microcontrollers, one or more application processors, one or more central processing units (CPU)s, one or more graphics processing units (GPU)s, one or more digital signal processors (DSP)s, one or more application specific integrated circuits (ASIC)s, one or more application specific standard products, one or more field programmable gate arrays, any other type or combination of integrated circuits, one or more state machines, or any combination thereof.

As used herein, the terminology "memory" indicates any computer-usable or computer-readable medium or device that can tangibly contain, store, communicate, or transport any signal or information that may be used by or in connection with any processor. For example, a memory may be one or more read-only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. Instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the term "application" refers generally to a unit of executable software that implements or performs one or more functions, tasks or activities. For example, applications may perform one or more functions including, but not limited to, telephony, web browsers, e-commerce transactions, media players, travel scheduling and management, smart home management, entertainment, and the like. The unit of executable software generally runs in a predetermined environment and/or a processor.

As used herein, the terminology "determine" and "identify," or any variations thereof includes selecting, ascertaining, computing, looking up, receiving, determining, establishing, obtaining, or otherwise identifying or determining in any manner whatsoever using one or more of the devices and methods are shown and described herein.

As used herein, the terminology "example," "the embodiment," "implementation," "aspect," "feature," or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "or" is intended to mean an inclusive "or" rather than an exclusive "or." That is unless specified otherwise, or clear from context, "X includes A or B" is intended to indicate any of the natural inclusive permutations. That is if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from the context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

Further, the figures and descriptions provided herein may be simplified to illustrate aspects of the described embodiments that are relevant for a clear understanding of the herein disclosed processes, machines, manufactures, and/or compositions of matter, while eliminating for the purpose of clarity other aspects that may be found in typical similar devices, systems, compositions and methods. Those of ordinary skill may thus recognize that other elements and/or steps may be desirable or necessary to implement the devices, systems, compositions and methods described herein. However, because such elements and steps are well known in the art, and because they do not facilitate a better understanding of the disclosed embodiments, a discussion of such elements and steps may not be provided herein. However, the present disclosure is deemed to inherently include all such elements, variations, and modifications to the described aspects that would be known to those of ordinary skill in the pertinent art in light of the discussion herein.

Described herein are methods and devices for dynamically configuring a gain of an amplifier in an intelligent tap. In an implementation, the intelligent tap measures a signal strength, compares the measured signal strength against a target signal strength, and dynamically sets the gain of the amplifier based on the signal strength comparison using a feedback loop. In implementations, the signal strength measurement can be done on a signal entering the amplifier. In implementations, the signal strength measurement can be done on a signal exiting the amplifier. Consequently, the intelligent tap can be deployed at any point along an HFC network to maintain the same target signal strength at each connected premises.

In implementations, the intelligent tap can include a control channel and controller to set and reset the target signal strength used in the feedback loop. This enables dynamically configuring the intelligent tap when modifications or changes are made in the HFC network. In implementations, the control channel can be used to retrieve data from components used in the intelligent tap. In implementations, the control channel can receive configuration data in response to the retrieved data for application to one or more of the components.

FIG. 1 is a diagram of an example network 1000 with intelligent taps in accordance with embodiments of this disclosure. In implementations, the network 1000 can include a CMTS 1100 via which a service provider can provide cable, television, Internet, voice, and like services to premises, residences, offices, and the like (collectively "premises") such as, for example, premises 1200. The CMTS 1100 is connected to or in communication with (collectively "connected to") the premises 1200 via an HFC network 1300 using an intelligent tap 1400. The premises 1200 can include a cable modem 1210 which is connected to the intelligent tap 1400 and subscriber equipment 1220. The cable modem 1210 is an example of customer premises equipment (CPE) and other CPE devices can be used without departing from the scope of the specification or claims. The network 1000 can include multiple intelligent taps including intelligent tap 1500 which is connected to cable modems 1600, 1610, 1620, and 1630, intelligent tap 1700, and the like. Each of the intelligent taps is dynamically configured to maintain a target signal strength at a CPE such as the cable modem 1210 and cable modems 1600, 1610, 1620, and 1630. The number of intelligent taps is illustrative and the network 1000 may include more or less intelligent taps.

The communications between elements or components in the network 1000 can include wired communications, wireless communications, or a combination thereof, as appropriate. The network 1000 and each element or component in the network 1000 is illustrative and can include additional, fewer or different devices, entities, element, components, and the like which can be similarly or differently architected without departing from the scope of the specification and claims herein. Moreover, the illustrated devices, entities, element, and components can perform other functions without departing from the scope of the specification and claims herein.

As described herein, the CMTS 1100 can provide cable, television, Internet, voice, and like services to premises. In addition, the CMTS 1100 can contain a provisioning and/or management function that can communicate with a control processor 1450 in the intelligent tap 1400 (as described herein) to manage the target value output from an amplifier 1420. In implementations, the provisioning function can be a provisioning server in the service provider network or cloud, such as, for example, server 1105, which can communicate via the CMTS 1100.

The cable modems 1210, 1600, 1610, 1620, and 1630 convert data for transmission between devices over a transmission medium such as the HFC network and the like. The cable modems 1210, 1600, 1610, 1620, and 1630 encode and decode digital information for transmission and reception between the devices.

The subscriber equipment 1220 can be, but is not limited to, end user devices, set-top boxes, personal computers (PCs), cellular telephones, Internet Protocol (IP) devices, computers, desktop computers, laptops, mobile devices, handheld computers, PDAs, personal media devices, smartphones, notebooks, notepads, phablets and the like which can be connected to the cable modem 1210, for example.

The intelligent tap 1400, along with all other similarly situated intelligent taps, can include active electronics such as, but not limited to, a digital filter (DF) 1410, a noise canceller, an amplifier 1420, and a signal strength measuring function or device 1430. The amplifier 1420, and the signal strength measuring function or device 1430 are configured in a feedback loop 1440. In implementations, the intelligent tap 1400 includes a controller or control processor 1450 which is connected to the CMTS 1100 and eventually service provider systems. The controller or control processor 1450 is communication with the CMTS 1100 via a control channel 1460. The intelligent tap 1400 is powered via the HFC network 1300.

The DF 1410 can be used to notch out interference. The noise canceller can be used to cancel near-end crosstalk in full-duplex configurations.

The amplifier 1420 can apply a signal strength measuring function or device 1430 controlled variable gain to an input signal so that the signal towards the subscriber equipment 1220 is at a constant amplitude. In implementations, the amplifying function can be either bi-directional or can include separate amplifying functions for each direction. In implementations, the amplification can be done in the digital domain using analog-to-digital converters, digital-to-analog converters, and digital signal processing. In implementations, the amplification can be done in the analog domain.

In FIG. 1, the signal strength measuring function or device 1430 can be situated on the customer side of the intelligent tap 1400. In this position, the signal strength measuring function or device 1430 can determine the signal strength toward the cable modem 1210. The signal strength measuring function or device 1430 can determine the signal strength by sampling the signal. The signal strength measuring function or device 1430 can then increase or decrease the gain of the amplifier 1420 to meet the target signal strength. In implementations, the signal strength measuring function or device 1430 can compare the measured signal strength against the target signal strength. In implementations, the signal strength measuring function or device 1430 can be situated on the network side of the intelligent tap 1400 to detect the strength of the signal arriving from the CMTS 1100. The signal strength can be used to increase or decrease the gain of the amplifier 1420 to meet the target signal strength.

In implementations, the feedback loop 1440 can be used to set an amplitude of the signal at a target constant value using the amplifier 1420 and the signal strength measuring function or device 1430. In implementations, the feedback loop 1430 can be statically configured to a default or target output amplitude from the intelligent tap 1400 to the cable modem 1210. As described herein, the controller or control processor 1450 and the control channel 1460 can be used to change the parameters of the feedback loop 1440 and the signal strength measuring function or device 1430 to adjust the output level of the intelligent tap 1400.

The controller or control processor 1450 is communication with the CMTS 1100 and the control channel 1460 can be used to remotely adjust parameters regarding the behavior of the intelligent tap 1400. For example, this control mechanism enables the signal to the subscriber equipment 1220 to be boosted to compensate for losses introduced by installation of splitters and the like. Messages can be sent to the intelligent tap 1460 so that the output of the intelligent tap 1400 towards the subscriber equipment 1220 can be adjusted up or down by modifying the signal strength via the feedback loop 1440, the amplifier 1420, and the signal strength measuring function or device 1430. In implementations, the control channel 1460 can be bi-directional so that status, telemetry, or performance information of the intelligent tap 1400 can be retrieved. The retrieved information can be used to configure the intelligent tap 1400. In implementations, the intelligent tap 1400 can be switched from an automatic configuration to a provisioned configuration and vice versa. In implementations, the intelligent tap 1400 can include a watch dog functionality where if a portion of the intelligent tap 1400 fails, the intelligent tap 1400 can fail over to a transparent bridge mode, or perform other like function. In implementations, the intelligent tap 1400 can be duplicated for redundancy purposes into a primary half and a secondary half. If the primary half fails, the intelligent tap 1400 fails over to the secondary tap and service continues uninterrupted. This allows for the service provider to defer dispatching for repair until multiple taps have failed thus reducing the overall number of dispatches and reducing operational expense.

Operationally, a signal is transmitted or sent by a service provider through the CMTS 1100 and carried by the HFC network 1300. Each intelligent tap, such as the intelligent tap 1400 for example, taps or diverts the signal towards a premises with CPE, such as the premises 1200 and the cable modem 1210. The intelligent tap 1400 processes the signal using the DF 1410, the noise canceler, and like circuits. The amplifier 1420 applies a gain to the signal, which is then sampled and compared by the signal strength measuring function or device 1430 to determine an amplifier gain adjustment value to maintain a target or constant amplitude. The signal strength measuring function or device 1430 feeds back the amplifier gain adjustment value to the amplifier 1420, which applies a gain pursuant to the amplifier gain adjustment value. The output of the amplifier 1420 is transmitted to the cable modem 1210, which in turn provides the signal to subscriber equipment, such as the subscriber equipment 1220. In implementations, the control processor 1450 can set and reset parameters for the components on the intelligent tap 1400 in response to receiving control or configuration signals or commands from the CMTS 1100 via the control channel 1460.

Figure 2:
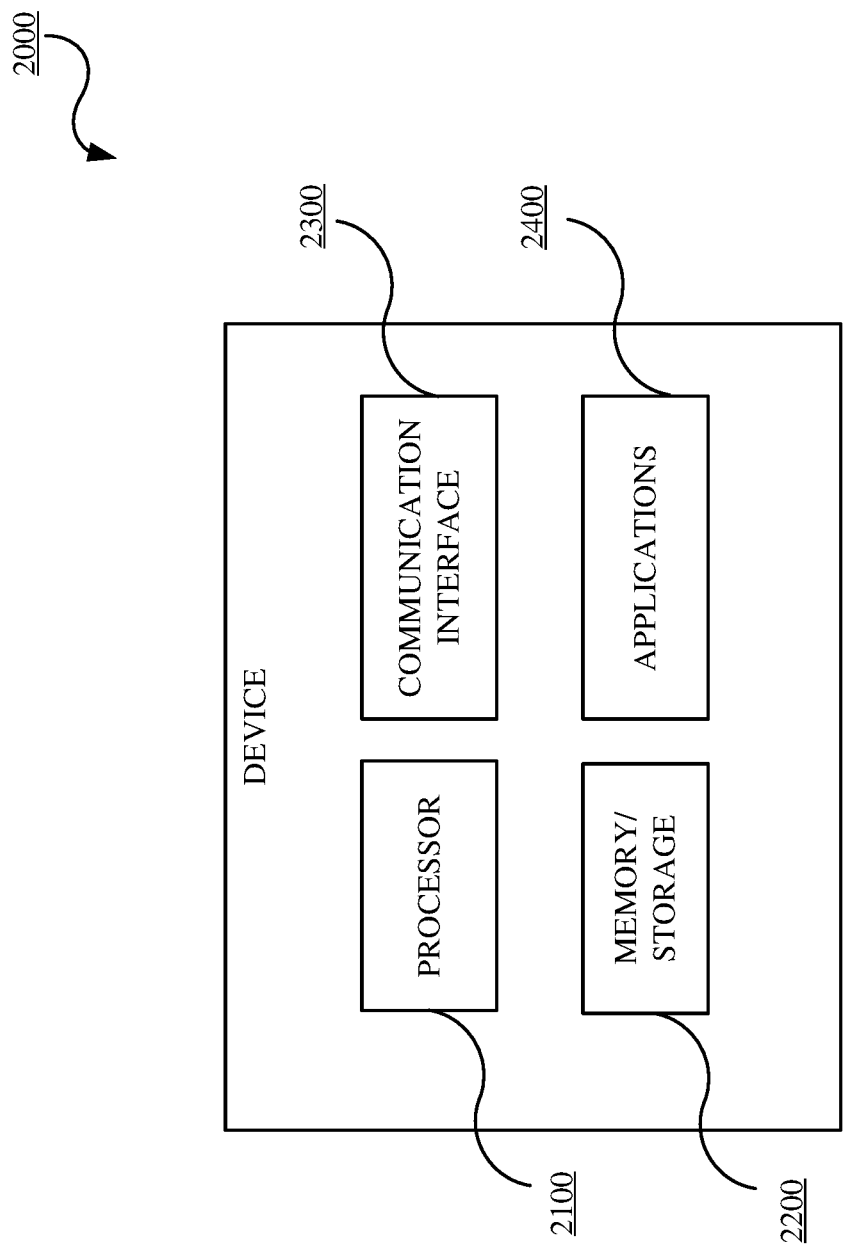
FIG. 2 is a block diagram of an example device in accordance with embodiments of this disclosure.

FIG. 2 is a block diagram of an example of a device 2000 in accordance with embodiments of this disclosure. The device 2000 may include, but is not limited to, a processor 2100, a memory/storage 2200, a communication interface 2300, and applications 2400. The device 2000 may include or implement, for example, the CMTS 1100, the cable modem 1210, the subscriber equipment 1220, the intelligent tap 1400, the digital filter 1410, the amplifier 1420, the signal strength measuring function or device 1430, the intelligent tap 1500, the cable modems 1600, 1610, 1620, and 1630, and the intelligent tap 1700. In an implementation, appropriate memory/storage 2200 may store the target signal strength, the intelligent tap parameters, and the like. In an implementation, appropriate memory/storage 2200 is encoded with instructions for at least controlling and managing the methods and techniques described herein. The techniques or methods described herein may be stored in appropriate memory/storage 2200 and executed by the appropriate processor 2100 in cooperation with the memory/storage 2200, the communications interface 2300, and applications 2400, as appropriate. The device 2000 may include other elements which may be desirable or necessary to implement the devices, systems, compositions and methods described herein. However, because such elements and steps are well known in the art, and because they do not facilitate a better understanding of the disclosed embodiments, a discussion of such elements and steps may not be provided herein.

Figure 3:
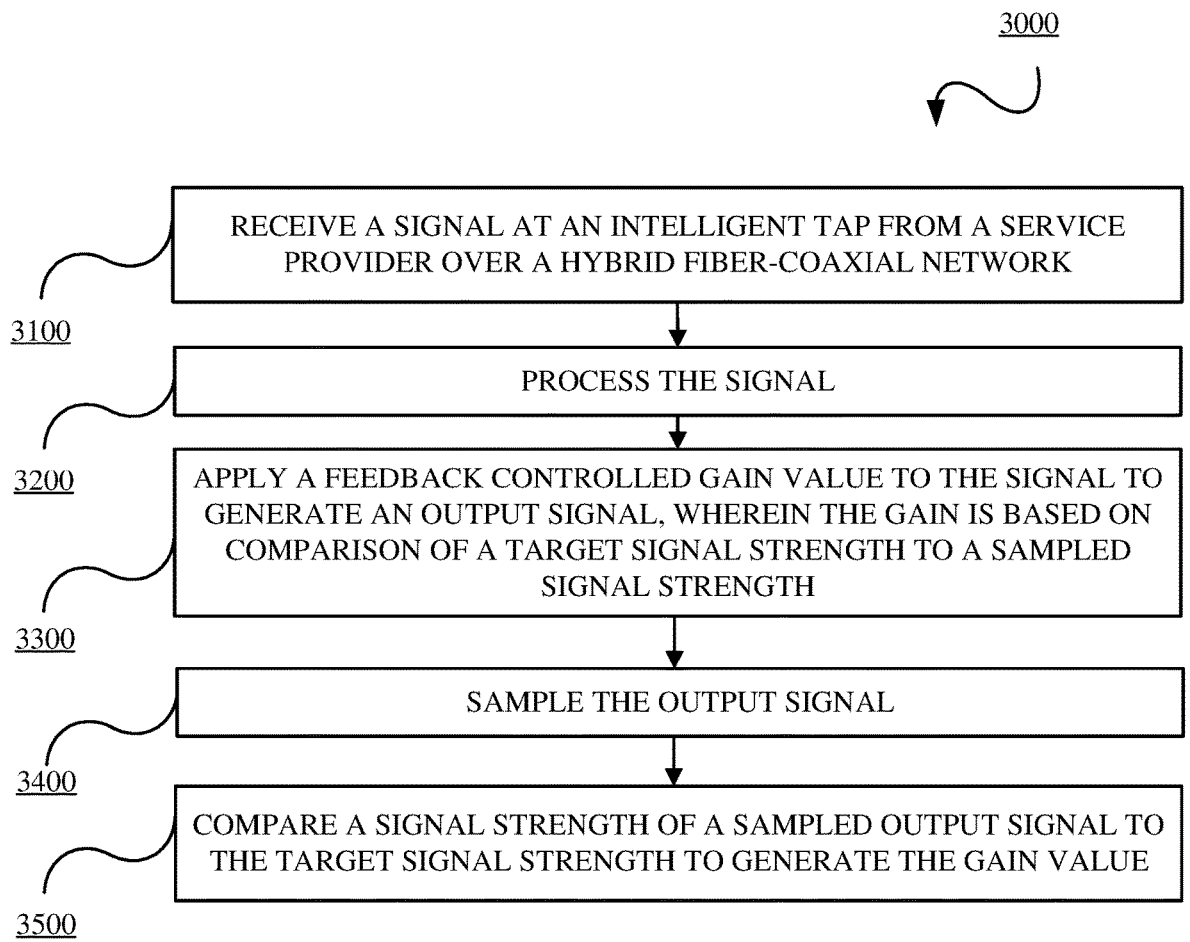
FIG. 3 is a flowchart of an example method for dynamically adjusting amplifier gain in accordance with embodiments of this disclosure.

FIG. 3 is a flowchart of an example method 3000 for dynamically setting an amplifier gain value in an intelligent tap in accordance with embodiments of this disclosure. The method 3000 includes: receiving 3100 a signal at an intelligent tap from a service provider over a hybrid fiber-coaxial network; processing 3200 the signal; applying 3300 a feedback controlled gain value to the signal to generate an output signal, wherein the gain is based on comparison of a target signal strength to a sampled signal strength; sampling 3400 the output signal; and comparing 3500 a signal strength of a sampled output signal to the target signal strength to generate the gain value. For example, the method 3000 may be implemented, as applicable and appropriate, by the CMTS 1100, the cable modem 1210, the subscriber equipment 1220, the intelligent tap 1400, the digital filter 1410, the amplifier 1420, the signal strength measuring function or device 1430, the intelligent tap 1500, the cable modems 1600, 1610, 1620, and 1630, the intelligent tap 1700, the processor 2100, the memory/storage 2200, the communication interface 2300, and the applications 2400.

The method 3000 includes receiving 3100 a signal at an intelligent tap from a service provider over a hybrid fiber-coaxial network. A service provider generates a signal containing content and transmits it to subscribers via a cable modem termination system (CMTS) and over the hybrid fiber-coaxial network. Each intelligent tap taps the signal from the hybrid fiber-coaxial network to send the signal to customer premises equipment. Subscriber equipment connected to the customer premises equipment should receive the signal at a target signal strength.

The method 3000 includes processing 3200 the signal. The signal is filtered and processed to mitigate noise and interference.

The method 3000 includes applying 3300 a feedback controlled gain value to the signal to generate an output signal, wherein the gain is based on comparison of a target signal strength to a sampled signal strength. An amplifier in the intelligent tap applies a feedback controlled gain value to signal to maintain a constant amplitude as set by the target signal strength. This gain applied signal is the output of the amplifier and the intelligent tap. In implementations, the target signal strength can be preset. In implementations, the target signal strength can be set using a controller connected to a provisioning or management function which may be located in the CMTS, the service provider network, or cloud via a control channel. In implementations, the controller can set and reset components of the intelligent tap. In implementations, the controller can obtain measurements from the components of the intelligent tap and transmit the measurements to the service provider via the control channel. In implementations, the controller can set the components of the intelligent tap based on instructions received from the service provider based on the measurements. In implementations, the controller can set the components of the intelligent tap based on the measurements. In implementations, in a system having multiple intelligent taps, the target signal strength can be the same for each of the intelligent taps. In implementations, the target signal strength can be individually set to account for signal splitters, for example, at the premises. For example, assume a user or customer has devices located in different rooms in the premises. A splitter can be used to send half the power down one branch, and the other half down the other branch. In this situation, the service provider may want to increase the signal level out of the intelligent tap to compensate for the additional splitter. This requirement for a stronger signal can be accommodated by signaling from the controller to the amplifier with a feedback loop to set a higher target output signal power out of the intelligent tap toward the customer premises without the need to dispatch a technician.

The method 3000 includes sampling 3400 the output signal. Samples of the output signal are taken to determine the feedback controlled gain value.

The method 3000 includes comparing 3500 a signal strength of a sampled output signal to the target signal strength to generate the gain value. The feedback controlled gain value is determined by comparing the signal strength of a sampled output signal to the target signal strength. This can be done in a digital or analog domain.

In general an intelligent tap includes a filter configured to process a content signal received from a service provider system via a hybrid fiber-coaxial network, an amplifier connected to the filter, the amplifier configured to apply a feedback controlled gain value to the content signal to generate an output content signal, wherein the feedback controlled gain value is based on a comparison of a target signal strength to a sampled output signal strength, and a signal strength measuring component connected to the amplifier in a feedback loop, the signal strength measuring component configured to sample the output content signal, and compare a signal strength of a sampled output signal to the target signal strength to generate the feedback controlled gain value, where application of the feedback controlled gain value maintains the output content signal at a constant amplitude pursuant to the target signal strength. In implementations, the intelligent tap includes a controller connected to the service provider system via a control channel, the controller configured to set the target signal strength based on input from the service provider system. In implementations, the controller further configured to set parameters for components in the intelligent tap including at least the filter, the amplifier, and the signal strength measuring component. In implementations, the controller further configured to obtain measurements from the components in the intelligent tap including at least the filter, the amplifier, and the signal strength measuring component. In implementations, the controller further configured to set the parameters based on the measurements. In implementations, the controller further configured to receive instructions based on the measurements from the service provider system to set the parameters.

In general, a method for dynamically adjusting an output signal of an intelligent tap includes receiving a media signal at an intelligent tap from a content provider system over a hybrid fiber-coaxial network, filtering the media signal to mitigate noise and interference on the media signal, generating an output media signal by applying a feedback controlled gain value to a filtered media signal, wherein the feedback controlled gain value is based on comparison of a defined signal strength to a sampled output media signal strength, sampling the output media signal, and generating the feedback controlled gain value by comparing a signal strength of a sampled output media signal to the defined signal strength, where application of the feedback controlled gain value maintains the output media signal at a constant amplitude pursuant to the defined signal strength. In implementations, the method further includes setting the defined signal strength based on content provider system control signals received over a control channel. In implementations, the method further includes setting intelligent tap component parameters based on content provider system control signals received over the control channel. In implementations, the method further includes sending intelligent tap component data to the content provider system control signals over the control channel. In implementations, the content provider system control signals are based on the intelligent tap component data. In implementations, the method further includes setting intelligent tap component parameters based on the intelligent tap component data.

In general, a system includes a cable modem termination system configured to transmit content signals, a hybrid fiber-coaxial network connected to the cable modem termination system, the hybrid fiber-coaxial network configured to carry the content signals transmitted by the cable modem termination system, a plurality of intelligent taps connected to the hybrid fiber-coaxial network, each intelligent tap connected to a customer premises equipment and each intelligent tap comprising a filter configured to process tapped content signals tapped from the hybrid fiber-coaxial network, an amplifier connected to the filter, the amplifier configured to apply a feedback controlled gain value to the tapped content signals to generate output content signals, where the feedback controlled gain value is based on a comparison of a target signal strength to a sampled output signal strength, and a signal strength measuring component connected to the amplifier in a feedback loop, the signal strength measuring component configured to sample the output content signals, and compare a signal strength of sampled output signals to the target signal strength to generate the feedback controlled gain value, where application of the feedback controlled gain value maintains the output content signals at a constant amplitude pursuant to the target signal strength. In implementations, each intelligent tap further including a controller connected to the cable modem termination system via a control channel, the controller configured to set the target signal strength based on input from the cable modem termination system. In implementations, the controller further configured to set parameters for components in the intelligent tap including at least the filter, the amplifier, and the signal strength measuring component. In implementations, the controller further configured to obtain measurements from the components in the intelligent tap including at least the filter, the amplifier, and the signal strength measuring component. In implementations, the controller further configured to receive instructions based on the measurements from the cable modem termination system to set the parameters. In implementations, the controller further configured to set the parameters based on the measurements. In implementations, the target signal strength is the same for each of the plurality of intelligent taps. In implementations, each intelligent tap further including a controller configured to set the target signal strength.

Although some embodiments herein refer to methods, it will be appreciated by one skilled in the art that they may also be embodied as a system or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "processor," "device," or "system." Furthermore, aspects of the present invention may take the form of a computer program product embodied in one or more the computer readable mediums having the computer readable program code embodied thereon. Any combination of one or more computer readable mediums may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to CDs, DVDs, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures.

While the disclosure has been described in connection with certain embodiments, it is to be understood that the disclosure is not to be limited to the disclosed embodiments but, on the contrary, is intended to cover various modifications, combinations, and equivalent arrangements included within the scope of the appended claims, which scope is to be accorded the broadest interpretation so as to encompass all such modifications and equivalent structures as is permitted under the law.

What is claimed is:

1. An intelligent tap, comprising:
    an amplifier configured to apply a feedback controlled gain value to a content signal to generate an output content signal, the content signal received via a hybrid fiber-coaxial network;
    a signal strength measuring component connected to the amplifier in a feedback loop, the signal strength measuring component configured to compare a signal strength of a sampled output signal to a target signal strength to generate the feedback controlled gain value; and
    a controller connected to a service provider system, the controller configured to obtain measurements from components in the intelligent tap including at least the amplifier,
    wherein application of the feedback controlled gain value maintains the output content signal at a constant amplitude pursuant to the target signal strength.

2. The intelligent tap of claim 1, further comprising:
    the controller configured to set the target signal strength based on input from the service provider system.

3. The intelligent tap of claim 2, the controller further configured to set parameters for the components in the intelligent tap including at least the amplifier and the signal strength measuring component.

4. The intelligent tap of claim 3, wherein the components in the intelligent tap include at least the signal strength measuring component.

5. The intelligent tap of claim 4, the controller further configured to set the parameters based on the measurements.

6. The intelligent tap of claim 4, the controller further configured to receive instructions based on the measurements from the service provider system to set the parameters.

7. The intelligent tap of claim 1, further comprising:
    a filter configured to process the content signal received from a service provider system via the hybrid fiber-coaxial network.

8. A method for dynamically adjusting an output signal of an intelligent tap, the method comprising:
    generating an output media signal by applying a feedback controlled gain value to a media signal, the media signal received via a hybrid fiber-coaxial network;
    generating the feedback controlled gain value by comparing a signal strength of a sampled output media signal to a defined signal strength; and
    obtaining, by a controller, intelligent tap component data including at least amplifier data,
    wherein application of the feedback controlled gain value maintains the output media signal at a constant amplitude pursuant to the defined signal strength.

9. The method of claim 8, the method further comprising:
    setting the defined signal strength based on received content provider system control signals.

10. The method of claim 8, the method further comprising:
    setting intelligent tap component parameters based on received content provider system control signals.

11. The method of claim 10, wherein the content provider system control signals are based on the intelligent tap component data.

12. The method of claim 8, the method further comprising:
    filtering the media signal to mitigate noise and interference on the media signal; and
    sampling the output media signal.

13. A system comprising:
    a cable modem termination system configured to transmit content signals;
    a hybrid fiber-coaxial network connected to the cable modem termination system, the hybrid fiber-coaxial network configured to carry the content signals transmitted by the cable modem termination system;
    a plurality of intelligent taps connected to the hybrid fiber-coaxial network, each intelligent tap connected to a customer premises equipment and each intelligent tap comprising:
        an amplifier configured to apply a feedback controlled gain value to the tapped content signals to generate output content signals;
        a signal strength measuring component connected to the amplifier in a feedback loop, the signal strength measuring component configured to compare a signal strength of a sampled output signal to a target signal strength to generate the feedback controlled gain value;

a controller connected to a cable modem termination, the controller configured to obtain measurements from components in the intelligent tap including at least an the amplifier, wherein application of the feedback controlled gain value maintains the output content signals at a constant amplitude pursuant to the target signal strength.

14. The system of claim 13, each intelligent tap further comprising:

the controller configured to set the target signal strength based on input from the cable modem termination system.

15. The system of claim 14, the controller further configured to set parameters for the components in the intelligent tap including at least the amplifier and the signal strength measuring component.

16. The system of claim 14, wherein the components in the intelligent tap include at least the signal strength measuring component.

17. The system of claim 16, the controller further configured to receive instructions based on the measurements from the cable modem termination system to set the parameters.

18. The system of claim 16, the controller further configured to set the parameters based on the measurements.

19. The system of claim 13, wherein the target signal strength is the same for each of the plurality of intelligent taps.

* * * * *